June 29, 1937.　　A. J. PENICK ET AL　　2,085,119
SEAL OFF TOOL
Filed June 13, 1935　　4 Sheets-Sheet 4
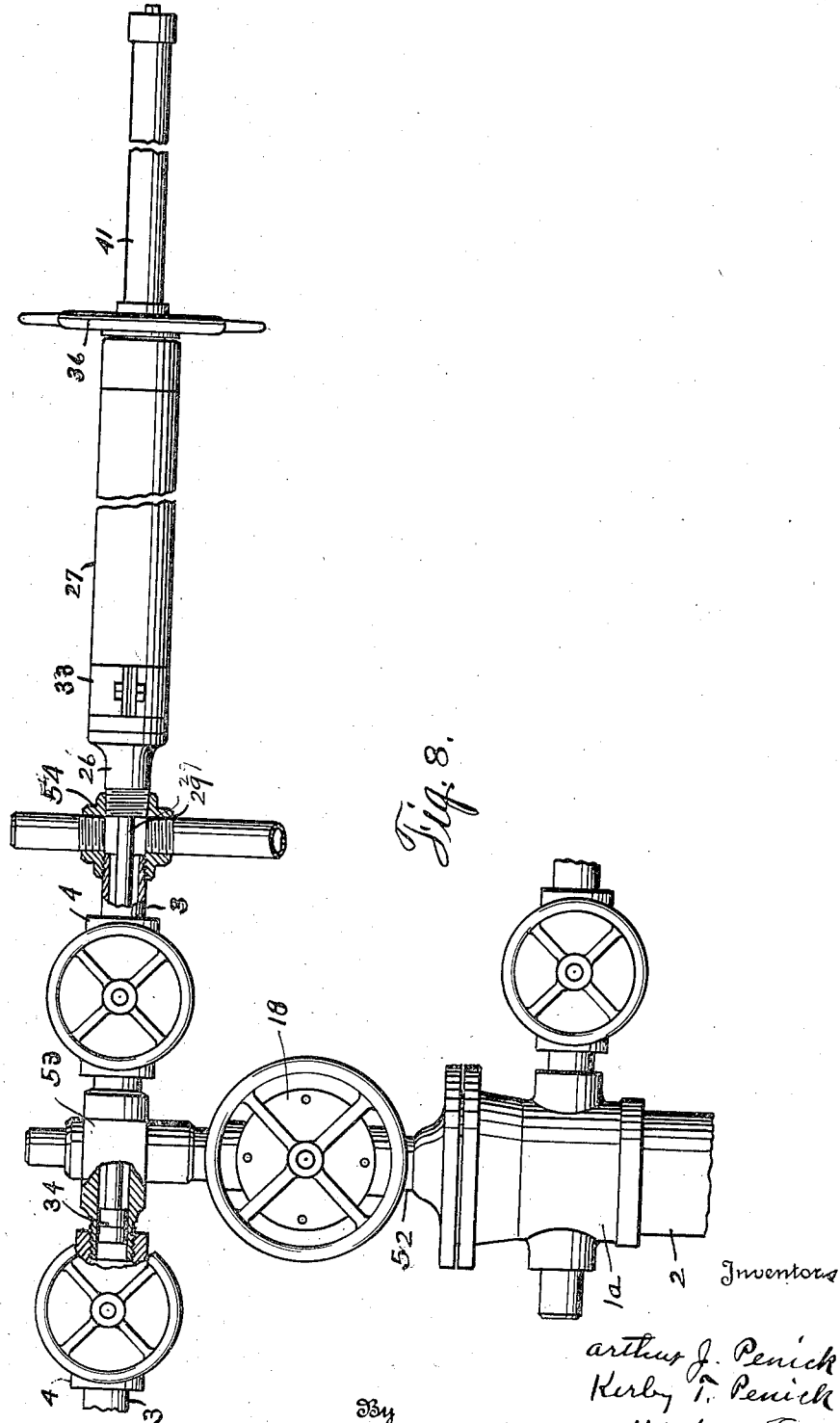

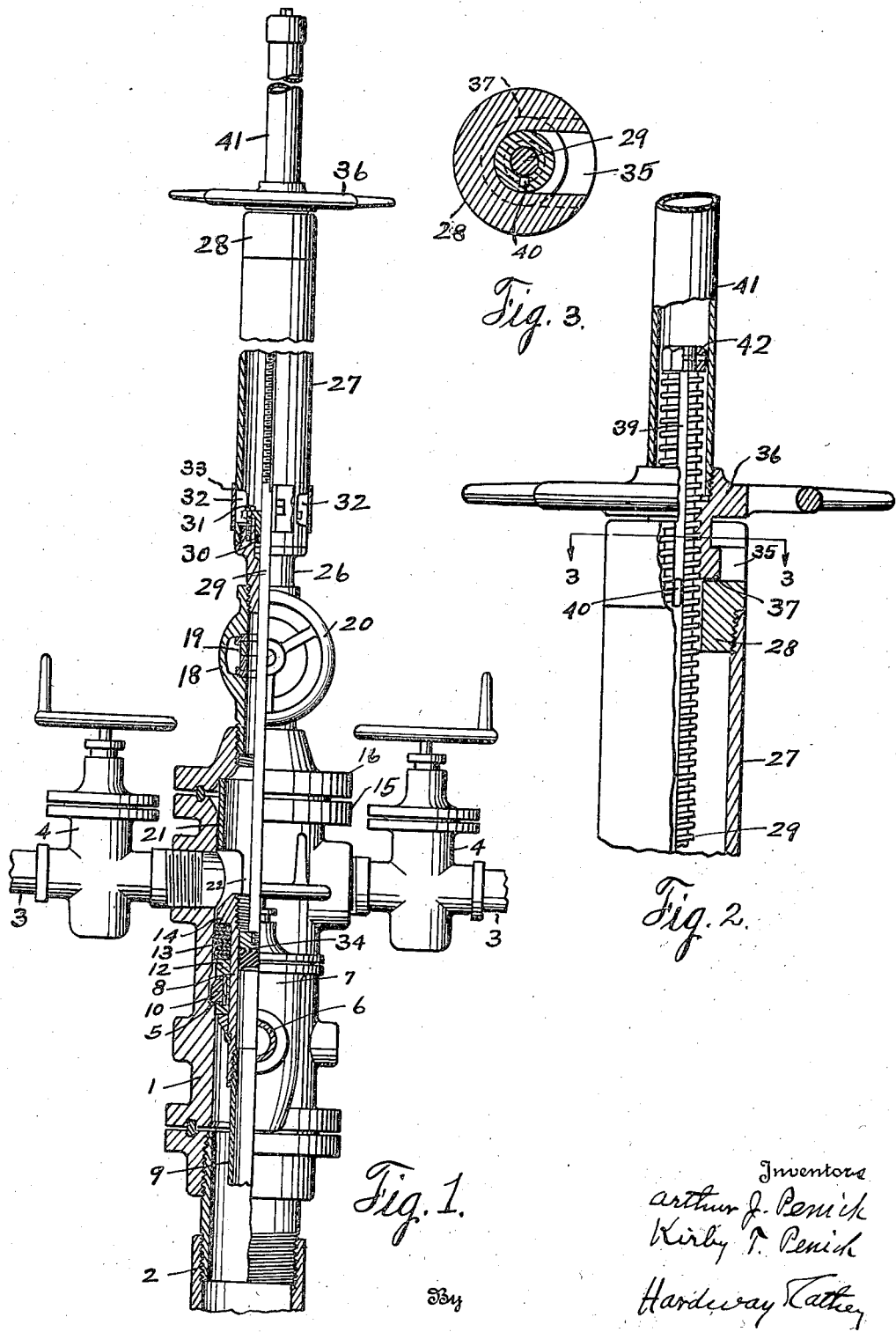

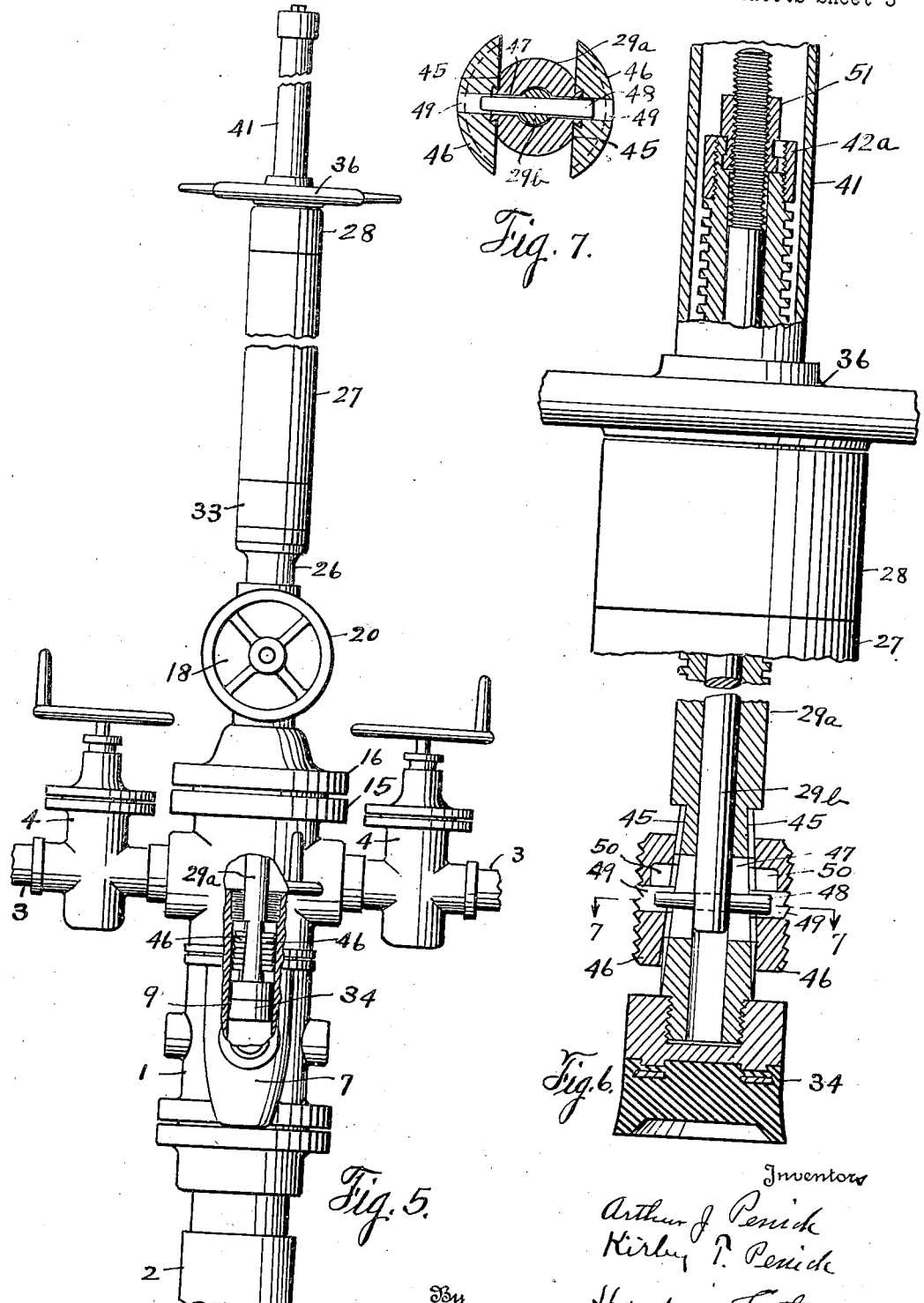

Patented June 29, 1937

2,085,119

UNITED STATES PATENT OFFICE 2,085,119

SEAL OFF TOOL

Arthur J. Penick and Kirby T. Penick,
Houston, Tex.

Application June 13, 1935, Serial No. 26,453

7 Claims. (Cl. 166—15)

This invention relates to a seal-off tool.

An object of the invention is to provide an apparatus of the character described adapted to be connected to the top of a tubing head and provided for the purpose of closing the upper end of the tubing in a well when it is desired to remove or repair the flow lines or valves controlling the flow of fluid from the tubing head.

Another object of the invention is to provide a seal-off tool that may be readily actuated into or out of active position, to control the flow of fluid from a well.

A further object of the invention is to provide novel means for maintaining the tubing hanger on its seat when the tubing is closed so as to prevent elevation of the tubing, when its upper end is closed, by the internal pressure in the well. The invention herein disclosed embodies certain improvements over the invention disclosed in our pending application Serial No. 60,652 for Well head filed January 24, 1936.

With the above and other objects in view the invention has particular relation to certain novel features of construction, operation, and arrangement of parts, examples of which are given in this specification and illustrated in the accompanying drawings, wherein:—

Fig. 1 shows a side view of the apparatus installed and in active position, and shown partly in section.

Fig. 2 shows an enlarged fragmentary side view, partly in section.

Fig. 3 shows a cross-sectional view taken on the line 3—3 of Fig. 2,

Fig. 5 shows a side view of the apparatus, shown partly in section, and disclosing additional means for securing the plunger in active position.

Fig. 6 shows an enlarged fragmentary sectional view thereof.

Fig. 7 shows a cross-sectional view taken on the line 7—7 of Fig. 6, and

Fig. 8 shows a side view, partly in section, of another form of the apparatus.

Figure 4:
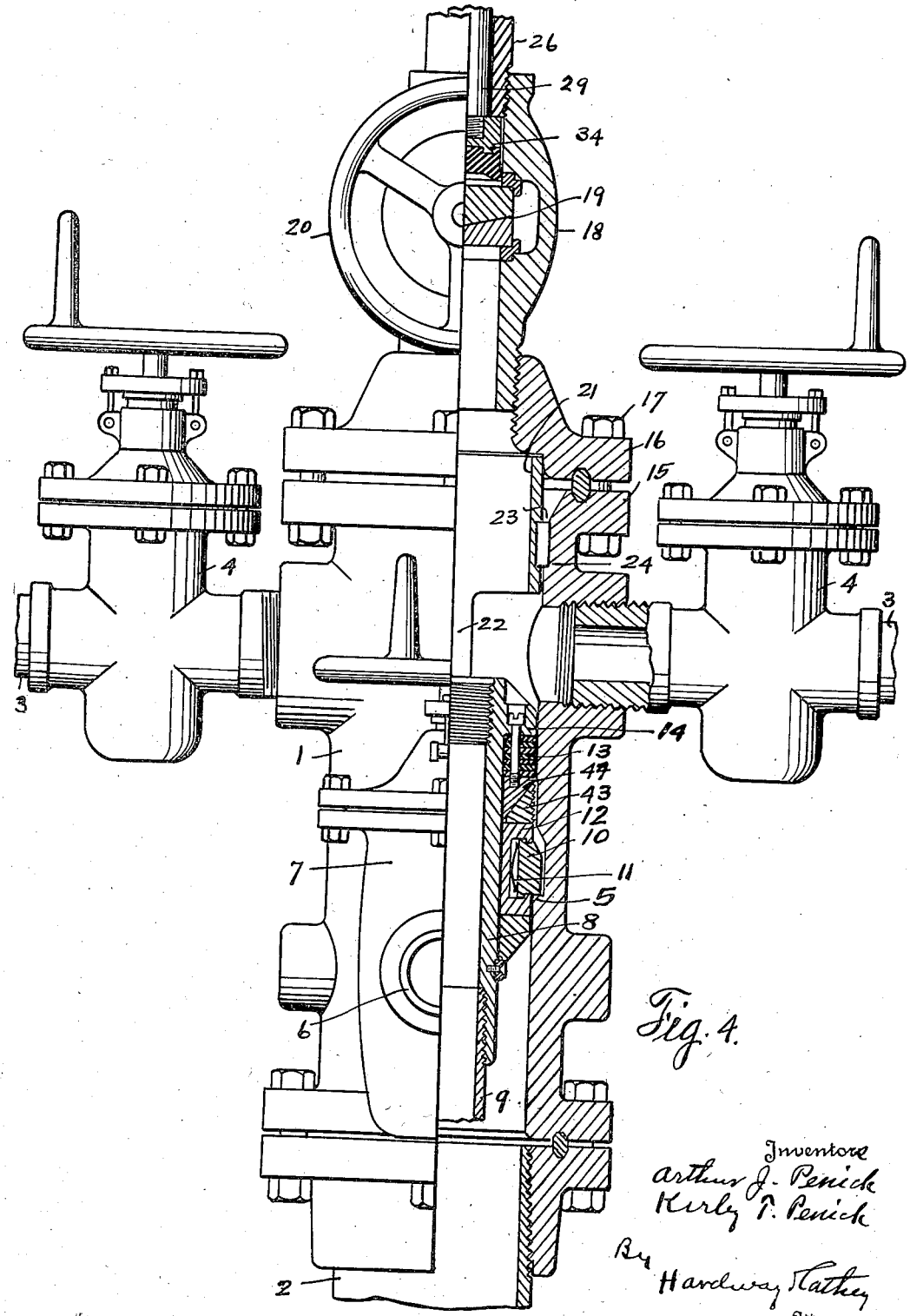
Fig. 4 shows an enlarged, fragmentary side elevation, partly in section, of a slightly modified form of the seal-off tool shown installed and in inactive position.

Referring now more particularly to the drawings wherein like numerals of reference designate similar parts in each of the figures, the numeral 1 designates a tubing head adapted to be secured to the upper end of a well casing 2 and having the outflow lines 3, 3, controlled by the valves 4, 4.

The head has the inside annular seat 5 beneath the flow lines 3, and beneath the said seat, has the out-flow lines 6, each controlled by a valve, as 7. The numeral 8 designates a tubular tubing hanger to which the tubing 9 is connected, and by means of which the tubing is suspended in the well. The hanger has a series of retractable dogs 10 therearound, normally held outwardly by the springs 11 to rest on the seat 5 to support the hanger. These dogs are mounted in a suitable cage 12 around the hanger.

In the form shown in Fig. 1 packing 13 is provided which surrounds the hanger and is seated on the cage 12 and the upper end of the hanger is enlarged forming an annular shoulder 14 which rests on said packing whereby the tubing hanger is supported with its upper end beneath the outflow lines 3, 3.

The upper end of the head has the annular flange 15, and mounted on this flange is the flange connection 16 which may be secured to the flange 15 in any suitable manner, preferably by bolts 17.

Attached to the flange connection 16 there is a gate valve casing 18 in which there is a valve 19 operable in the usual way by the hand wheel 20. Fitted within the upper end of the head 1, there is the sleeve 21 whose upper end abuts the flange connection 16, and whose lower end has the oppositely disposed legs 22 depending therefrom which rest against the upper end of the hanger 8. These legs are arranged between the outlet lines 3 so as not to close, or restrict, said lines, and are maintained in that position by means of the key 23 which is carried by the sleeve 21 and fits into the keyway 24 in the upper end of the head.

During normal production from the well, the upper end of the valve casing 18 is closed by a plug of any conventional design, or may have an outflow line connected thereto. In case it becomes necessary to repair or replace the valves 4, or for any reason disconnect the lines 3, it is necessary to close the tubing 9 to prevent the flow of the fluid therethrough and this may be done by means of the attachment presently to be described.

There is a tubular nipple 26 adapted to be screwed into the upper end of the valve casing 18, and a tubular housing 27 has its lower end attached to said nipple. Screwed into the upper end of the housing there is the gland 28.

Fitted through the nipple 26 there is a plunger rod 29 and a suitable stuffing box 30 is secured to the upper end of the nipple 26 and surrounds the plunger rod 29. The adjusting bolts 31 of this stuffing box are accessible for the adjustments through the openings 32 in the side of the housing 27, and these openings are normally closed by a removable sleeve 33 around the housing. The lower end of the plunger rod 29 has the plunger 34 attached thereto, and the outer end of said rod is provided with external coarse threads and extends through the gland 28. The gland 28 has a side slot 35 which is dove-tailed in cross-section, and there is a hand wheel 36 whose hub is internally threaded to receive the coarse threads of the rod 29 and the lower end of the hub has an external annular flange 37. The hub of the hand wheel may be moved laterally through the slot 35 into place, and the upper end of the rod then screwed therethrough in assembling the apparatus, and said rod will hold the hand wheel in position as mounted in the gland 28.

The threaded end of the plunger rod has a longitudinal keyway 39, and there is a key 40 carried by the gland 28 which projects into said keyway to prevent the plunger rod from turning. The housing 41 has its lower end screwed into the upper end of the hub of the hand wheel 36, and this housing turns with said hand wheel and encloses the upper end of the plunger rod.

When the apparatus is to be attached to the top of the valve casing 18, the hand wheel 36 should be turned to move the plunger 34 into position against the end of the nipple 26. When it is desired to make repairs or replacements to the flow-lines, the valve 19 may be closed and the plug, previously referred to, may be removed from the upper end of the valve casing 18 and the nipple 26 attached thereto, as shown in Fig. 4. The valve 19 may then be opened and the hand wheel 36 turned to move the plunger rod 29, and the plunger 34 downwardly until said plunger enters the upper end of the hanger 8. The tubing will thus be sealed off or closed so as to prevent the outflow of fluid through the tubing and the valves 4, and the flow lines 3 may then be detached or repaired, or replaced without interference from the flowing fluid.

When the tubing is thus closed, the sleeve 21, and its legs 22, will prevent the upward movement of the tubing due to the well pressure.

The downward movement of the plunger 34 and the plunger rod 29 is limited by the nut 42 which is attached to the upper end of the rod 29 and which is adapted to engage the hub of the hand wheel 36.

For the purpose of additionally securing the tubing against upward movement, we have provided the outwardly-toothed slips 43 whose inner sides are upwardly and outwardly flared. These slips rest on the upper end of the cage 12, and fitted within them there is the wedge-shaped slip ring 44 which surrounds the tubing hanger 8. In this form the packing 13 rests on the slip ring and the weight of the tubing will operate, through the slip ring, to hold the slips outwardly in engagement with the surrounding walls of the head 1.

Referring now to the form shown in Figs. 5 to 7 inclusive, the plunger rod 29a is shown tubular and fitted through it there is the slip-actuating rod 29b. The lower end of the plunger rod 29a has the oppositely arranged downwardly flared faces 45, 45, on which the slips 46, 46, are slidable, and with which said slips have a dove-tailed connection as shown in Figs. 6 and 7. These slips are outwardly toothed, as shown, and the plunger rod 29a has a slot 47 therethrough and a pin 48 is fitted through and anchored to the rod 29b and works through said slot. The slips have the holes 49, 49, therethrough to permit the insertion and removal of said pin, and the inner ends of the holes 49 are upwardly widened, as at 50, 50, as shown in Fig. 6, so as to allow the required range of movement of the slips 46, on the faces 45.

Threaded onto the upper end of the plunger rod 29a there is the nut 42a for the same general purpose as that of the nut 42 shown in Fig. 2.

The upper end of the rod 29b is outwardly threaded and is extended above the corresponding end of the rod 29a and has the nut 51 threaded thereon and having a swivelling connection with the upper end of the plunger rod 29a. This nut 51 is assembled with the rod 29a in the same manner as the hand wheel 36 is assembled with the gland 28, as hereinabove explained. In other respects the construction shown in Figs. 5 to 7 inclusive is substantially the same as that shown in Fig. 1.

When the apparatus shown in Fig. 5 is assembled and the hand wheel 36 rotated, to run the plunger 34 down into the tubing 9, the slips 46 will enter said tubing or the tubing hanger at the upper end of the tubing and will be in position to engage the walls of the said tubing or hanger. Should the pressure in the well then move the plunger 34 upwardly, the slips 46 will engage the surrounding walls and securely anchor said plunger in place. The outflow of fluid from the tubing will thus be prevented and the flow lines leading from the tubing head, as well as the valves with which said flow lines are equipped may be removed, repaired, or replaced. The apparatus mounted on the flange connection 16 may be now dismantled and removed and said flange connection 16 may also be removed, if desired, leaving only the plunger rod 29a and the appendants thereof in place.

When it is desired to remove the plunger 34 from the tubing the nut 51 may be turned to elevate the rod 29b and thereupon the projecting ends of the pin 48 will engage the slips 46 and move said slips upwardly and inwardly to release the tubing or tubing hanger.

In the form shown in Fig. 8, another form of tubing head assembly is disclosed wherein a head 1a is secured to the upper end of the casing 2 and leading upwardly from said head 1a is a flow line 52 connected into which is a suitable gate valve, as 19. A T-connection 53 is connected into the flow line 52 above the gate valve 19 and the lateral flow lines 3, 3, lead out from this T-connection and are controlled by the valves 4, 4. In this form the apparatus, for actuating the plunger 34, may be attached to a coupling 54 incorporated into one of the flow lines 3 and the corresponding valve opened and the plunger 34 actuated in the manner hereabove explained through the said valve, and across the T-connection 53 into position to close the other flow line 3 so that said last-mentioned flow line, or the valve controlling the same, may be disconnected and repaired and be replaced without interference from the flowing fluid. While making the connection of the apparatus to the coupling 54, the valve 19, or the corresponding valve 4, should be closed.

With the plunger 34 in active position, shown in Fig. 8, so as to close one of the flow lines 3, the valve 19 and the valve 4 controlling the other flow line may be opened so as to permit a continuation of the flow while said closed flow line and its valve are being disconnected, replaced, or otherwise worked on.

The drawings and description disclose what are now considered to be preferred forms of the invention by way of illustration only, while the broad principle of the invention will be defined by the appended claims.

What we claim is:

1. In combination, a tubing head for wells having outflow lines each provided with an inside seat, a tubing suspended in a well from the head, means detachably secured to one of said lines, and having a closure member operative across the head and through one seat into position to enter the other seat and to block the flow of fluid from the tubing through the other line.

2. In combination, a tubing head for wells having outflow lines, a valve for opening or closing one of said lines, a tubing suspended in the well from the head, means detachably secured to the valve-controlled line and having closure means operative through the valve, when the valve is open, into active position into the other line to prevent the flow of fluid from the tubing through the other line, said closure means being withdrawable into inactive position through the valve to permit the valve to be closed.

3. In combination, a tubing head assembly for wells having two laterally extended, oppositely arranged, tubes one of which is provided with a valve for controlling the same, a tubing suspended into the well from the head, a closure member movable through the valve, when the valve is open, and transversely across the head into active position to prevent the flow of fluid from the tubing through the other tube, said closure member being retractable, through the valve, into inactive position to permit the valve to close.

4. In combination, a tubing head assembly for wells having outwardly extended tubes at least one of which is provided with a valve for controlling the same, a tubing suspended into the well from the head, a closure member movable through the valve, when the valve is open, into active position into the other tube to prevent the flow of fluid from the tubing through the other tube, said closure member being retractable, through the valve, into inactive position to permit the valve to close, and means removably secured to the valve-controlled tube and including an actuating rod attached to the closure member whereby the closure member may be manually actuated into active or inactive position.

5. The combination with a tubing head having a tubing therein, and suspended therefrom, of a plunger shaped to fit into and to close the upper end of the tubing, and means removably supported on the head for operating the plunger into active position to close the upper end of the tubing, and into inactive position clear of said head, slips associated with the plunger and engageable with the tubing to anchor the plunger against upward movement relative to the tubing and a slip actuating rod working through the plunger-operating means.

6. The combination with a tubing head having a tubing therein, and suspended therefrom, of a plunger shaped to fit into and to close the upper end of the tubing, and means removably supported on the head for operating the plunger into active position to close the upper end of the tubing, and into inactive position clear of said head, slips associated with the plunger and engageable with the tubing to anchor the plunger against upward movement relative to the tubing, and means working axially through the plunger operating means for releasing the slip from the tubing to permit withdrawal of the plunger.

7. A seal off tool comprising a housing, tubular attaching means connected to one end of the housing, a rod movable longitudinally through the housing and attaching means, means on the housing operatively connected with the rod whereby the rod may be actuated longitudinally of the housing, a plunger on the rod out beyond the attaching means, an engaging slip on the rod and means working axially through the rod for controlling the position of said slips, said rod actuating means comprising a gland attached to the housing through which the rod extends, said gland having a dovetailed side slot, a hand wheel having a hub through which the rod is threaded, said hub being fitted into said side slot and having a flange which has a dovetailed connection with said slot.

ARTHUR J. PENICK.
KIRBY T. PENICK.